United States Patent [19]

Mock et al.

[11] Patent Number: 5,685,945

[45] Date of Patent: Nov. 11, 1997

[54] METHOD AND APPARATUS FOR SEPARATING ONE OR MORE OPTICAL FIBERS FROM AN OPTICAL FIBER RIBBON

[75] Inventors: George Edwin Mock, Duluth; Krishnaswamy Kathiresan, Marietta; Clyde Jefferson Lever, Jr., Buford, all of Ga.

[73] Assignee: Lucent Technologies Inc., Murray Hill, N.J.

[21] Appl. No.: 580,920

[22] Filed: Dec. 29, 1995

[51] Int. Cl.$^6$ ..................................... B32B 35/00
[52] U.S. Cl. .................. 156/584; 156/344; 385/135; 7/107; 29/564.1
[58] Field of Search ..................... 156/584, 344; 385/135; 7/107; 81/9.4, 9.41, 9.42, 9.43, 9.44, 9.51; 29/564.1, 564.3, 564.4

[56] References Cited

U.S. PATENT DOCUMENTS

| | | | |
|---|---|---|---|
| Re. 28,468 | 7/1975 | Baumgartner et al. | 339/14 L |
| 3,884,276 | 5/1975 | Poplaski | 29/564.1 X |
| 3,920,432 | 11/1975 | Smith | 65/4 |
| 3,984,172 | 10/1976 | Miller | 350/96 B |
| 4,035,211 | 7/1977 | Bill et al. | 156/54 |
| 4,100,003 | 7/1978 | Trusch | 156/54 |
| 4,289,558 | 9/1981 | Eichenbaum et al. | 156/179 |
| 4,310,209 | 1/1982 | Fleming et al. | 339/14 R |
| 4,329,764 | 5/1982 | Sakaue et al. | 29/564.1 X |
| 4,517,718 | 5/1985 | Johnson, Jr. | 29/564.1 X |
| 4,730,894 | 3/1988 | Arroyo | 350/96.23 |
| 4,896,940 | 1/1990 | Kathiresan et al. | 350/96.23 |
| 4,900,126 | 2/1990 | Jackson et al. | 350/46.23 |
| 4,973,127 | 11/1990 | Cannon, Jr. et al. | 350/96.22 |
| 4,980,007 | 12/1990 | Ferguson | 156/179 |
| 5,076,881 | 12/1991 | Ferguson | 156/436 |
| 5,179,251 | 1/1993 | Mullin et al. | 174/23 C |
| 5,243,675 | 9/1993 | Kathiresan et al. | 385/109 |
| 5,389,192 | 2/1995 | Takimoto et al. | 156/584 |
| 5,460,682 | 10/1995 | Beasley et al. | 156/584 X |
| 5,460,683 | 10/1995 | Beasley, Jr. et al. | 156/584 X |

FOREIGN PATENT DOCUMENTS 246961  11/1987  European Pat. Off. ............ 385/135

*Primary Examiner*—Mark A. Osele

[57] ABSTRACT

A method and apparatus for separating one or more optical fibers from an optical fiber ribbon is disclosed by the present invention. This device includes a housing with a base and a cap, the base providing support for the optical fiber ribbon and the cap providing a slotted member for exerting lateral force on the ribbon to separate one or more fibers therefrom without damaging the separated fibers or compromising the integrity of the remainder of the ribbon.

16 Claims, 4 Drawing Sheets

METHOD AND APPARATUS FOR SEPARATING ONE OR MORE OPTICAL FIBERS FROM AN OPTICAL FIBER RIBBON

FIELD OF THE INVENTION

This invention relates to a method and apparatus for splitting optical fiber ribbons and, more particularly, to a method and apparatus for mechanically separating one or more optical fibers from an optical fiber ribbon assembly.

BACKGROUND OF THE INVENTION

Optical fibers are, today, in widespread use as signal transmission media, and it is anticipated that such use will become even more widespread in the future. Their popularity stems from their large band width capability, which is orders of magnitude greater than electrical conductors, and from their small size. However, optical fibers are mechanically fragile and exhibit low strain fracture resistances under tensile loading. In addition, such fibers cannot be sharply bent inasmuch as the light transmission therethrough can be seriously degraded by too sharp a bend, and the fiber itself can be fractured by such a bend. The fibers, when assembled into a cable, must be capable of withstanding tensile loads and binding stresses caused when the cable is pulled along its routing and through turns.

Such optical fibers are typically produced and bonded together so as to provide a fiber array or ribbon containing multiple fibers. The ribbon may have any number of fibers but are commonly assembled in a co-planar array having four, six, eight, twelve, sixteen, or twenty-four fibers, with a twenty-four fiber ribbon currently being most prevalent. As the use of such ribbons increases, the number of fibers in the array is also expected to increase; however, and cables or ribbons with hundreds or thousands of individual optical fibers are possible and even likely to appear. Such ribbons and a method of producing same are described respectively, in U.S. Pat. No. 4,900,126 to Jackson et al. and U.S. Pat. Nos. 4,980,007 and 5,076,881, both to Ferguson. These patents, of common assignee, and a paper entitled *A Modular Ribbon Design For Increased Packing Density Of Fiber Optic Cables* by Jackson et al. are incorporated herein by reference.

As discussed in the above-mentioned references, the multiple optical fibers are typically color-coded and held together by a cladding which secures the fibers in the desired array. The fibers may; however, be easily separated, singly or in groups, as the modulus of the cladding or bonding material is such that interfiber movement is allowed. The fibers can be accessed individually, yet the bonding material provides suitable mechanical properties for the entire array such that the ribbon maintains its bonded state absent a positive attempt to separate fibers from the ribbon.

Methods for separating individual fibers from the array vary, with one method, that of Jackson et al. in U.S. Pat. No. 4,900,126, being described as the application of peeling forces by a craftsperson. While easily accomplished when dealing with the end of a ribbon, such an operation is considerably more difficult if the ribbon must be separated at some point between its ends, to cull out one or more fibers for routing elsewhere. Razor blades or knives have been used in the past; however, these generally lack the required precision when dealing with the close tolerances of the ribbons. Since some or all of the fibers in the ribbon may be in use or "live," it is extremely important that the fibers not be nicked or cut during separation, which would result in a diminished or total loss of signal.

Another method used for separating individual fibers from the ribbon is through the use of chemical means. Soaking the ribbon in alcohol or another suitable solution can dissolve the matrix or bonding material which secures the fibers together in an array. One particularly disadvantageous result is that the dissolution of the bonding material separates all of the fibers. While individual fibers may now be selected out and routed elsewhere, the separated fibers in the ribbon must then be resecured to ensure the integrity of the remaining fibers. Such resecurement can be unwieldy, at best, and at worst, impossible, depending on the location of the ribbon and/or its environment. In addition, depending on the location of the ribbon and/or the composition of the bonding material holding the fibers together, chemical methods of separation may not be possible or may be hazardous to the ribbon, the serviced equipment, or the technician.

From the above discussion, it will be appreciated by those skilled in the art, that a means for separating individual fibers or groups of fibers from a multi-fiber ribbon is necessary and would be extremely useful. The deficiencies in the prior art are also readily apparent. It is to the solving of the instant problem and the avoidance of the shortcomings of the prior art to which the present application is addressed.

SUMMARY OF THE INVENTION

It is, therefore, one of the principal objects of the present invention to provide a convenient means and method of separating any number of individual fibers from a ribbon array while avoiding damage to any of the fibers and maintaining the integrity of the non-separated fibers remaining in the ribbon.

Another object of the present invention is to provide a device which easily separates individual fibers from a ribbon without signal loss in any "live" fibers and without having to dissolve the bonding material.

A further object of the present invention is to facilitate the repair of fibers arrayed in ribbons which do break for whatever reason due to the ease of access to individual fibers which the present invention provides.

A still further object of the present invention is to provide a compact tool which is easily used by technicians in the field, due to its requiring a minimum of training for its successful use and which is durable to provide a long service life.

An additional object of the present invention is to teach a method for separating individual fibers or groups of fibers from optical fiber ribbons which preserves the integrity of the fibers, the ribbons, and where applicable, the signals being transmitted through the "live" fibers in the array.

These and other objects are attained by the present invention which, in general, includes a housing member with means provided therein for receiving and supporting an optical fiber ribbon. The receiving means is designed to maintain the ribbon in its co-planar array and to support the ribbon along a sufficient portion of the length thereof to stabilize that portion of the ribbon where the separation of the fibers is desired.

In a preferred embodiment of the present invention, the housing member includes a base portion and a cap which is connected to the base by a hinge. The cap is raised to allow insertion of the ribbon and then closed for the separation operation. The support means for the ribbon is disposed in the base. The cap contains a slotted wheel member, with certain of the slots therein receiving a portion of the ribbon when the cap is closed, depending on the number of fibers to be separated from the ribbon. In this embodiment, the depth of the slots are progressively arranged to received from one fiber to twelve fibers, with all of the numbers therebetween included. Any number of fibers up to twenty-four, in this embodiment, are received in and supported in the base. The ribbon can be then inverted should it be necessary to separate fibers from the opposite side. When the ribbon is inserted and ready for separation, a handle in the cap is depressed to fully seat the fiber ribbon and then turned slightly to angularly displace the receiving slot relative to the support. This exerts a lateral force on the ribbon so as to cause the selected fiber or fibers to be separated from the ribbon array. The above discussion is designed to provide a representative example of the present device and its method of operation. The device may, of course, be reduced or enlarged in size, as will be readily apparent to those skilled in the art, and no limitations on the construction of the device are to be implied.

Various additional objects and advantages of the present invention and its method of use will become apparent from the detailed description below, with reference to the accompanying drawings.

DETAILED DESCRIPTION OF THE PREFERRED EMBODIMENT

Figure 1:
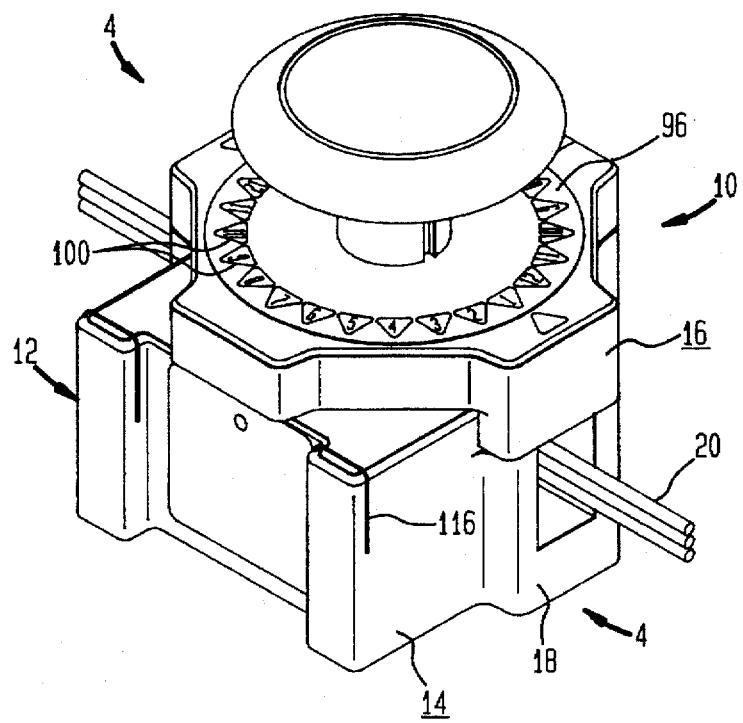
FIG. 1 is a perspective view of the present ribbon splitting device, shown with a ribbon to be separated inserted therein.
Figure 7:
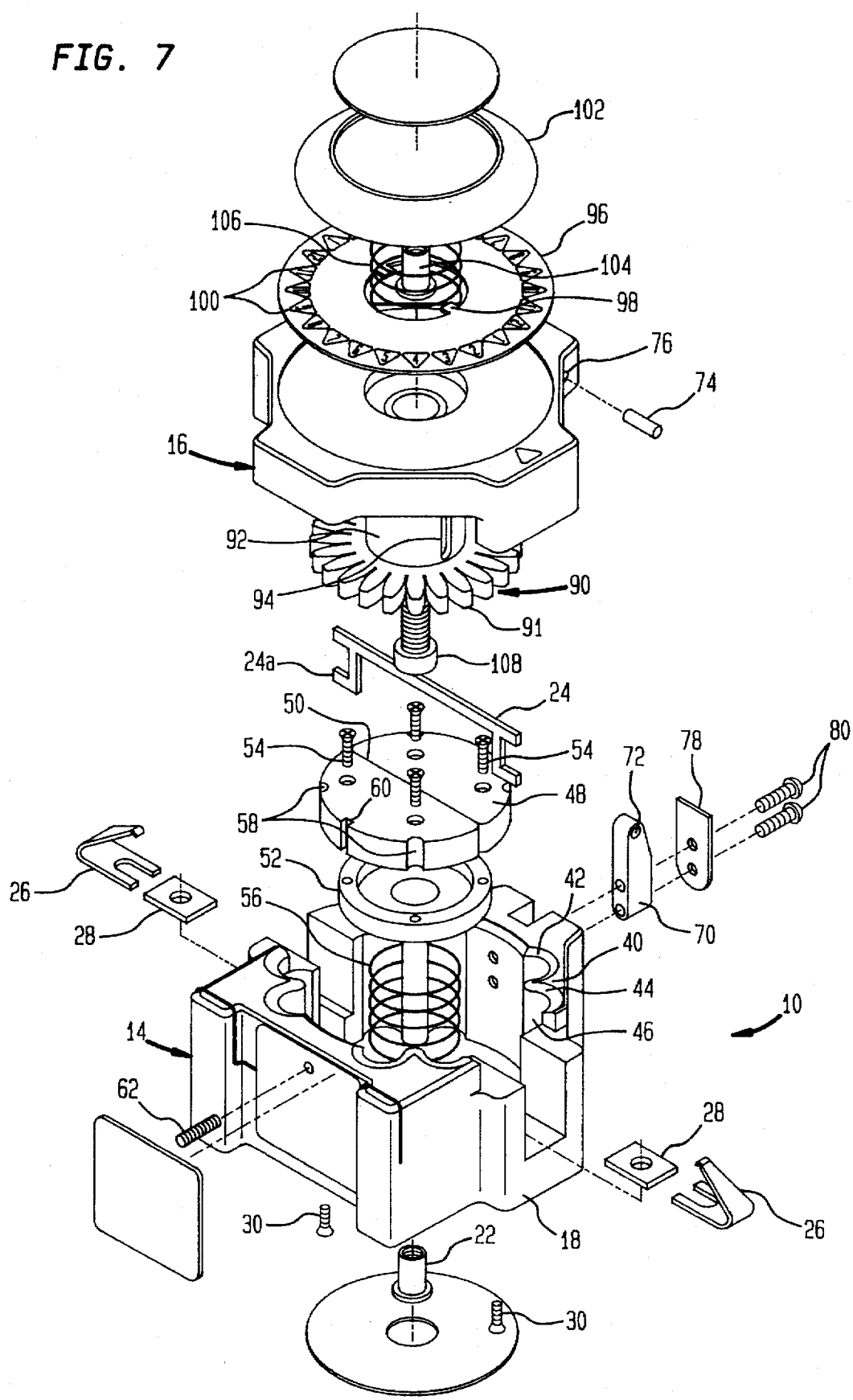
FIG. 7 is an exploded perspective view of the present invention, illustrating the components thereof.

Referring now more specifically to the drawings, and to FIGS. 1 and 7 in particular, numeral 10 designates generally the optical fiber ribbon splitting device comprising the present invention.

The device includes a multi-faceted housing 12 with a base member 14 and a cap 16. The base has a wide central region to provide adequate length to support the ribbon. The various facets provide convenient and comfortable gripping surfaces if the housing is held by the technician while working in the field. A threaded insert 22 is located in the bottom of the base so that the housing can be mounted on a tripod or other support.

The bottom end of the ribbon is supported in the base on an elongated horizontal bar 24 which is substantially the same width or slightly greater than the width of an individual fiber in the ribbon. The bar 24 and extensions 24a is in turn supported at each end by leaf springs 26 held in place by clamps 28 that are fastened by screws 30 at the outer ends of the widened central region. The leaf springs are relatively stiff to provide a firm but slightly flexible support for the ribbon, the reason for which will be explained in greater detail below.

Figure 2:
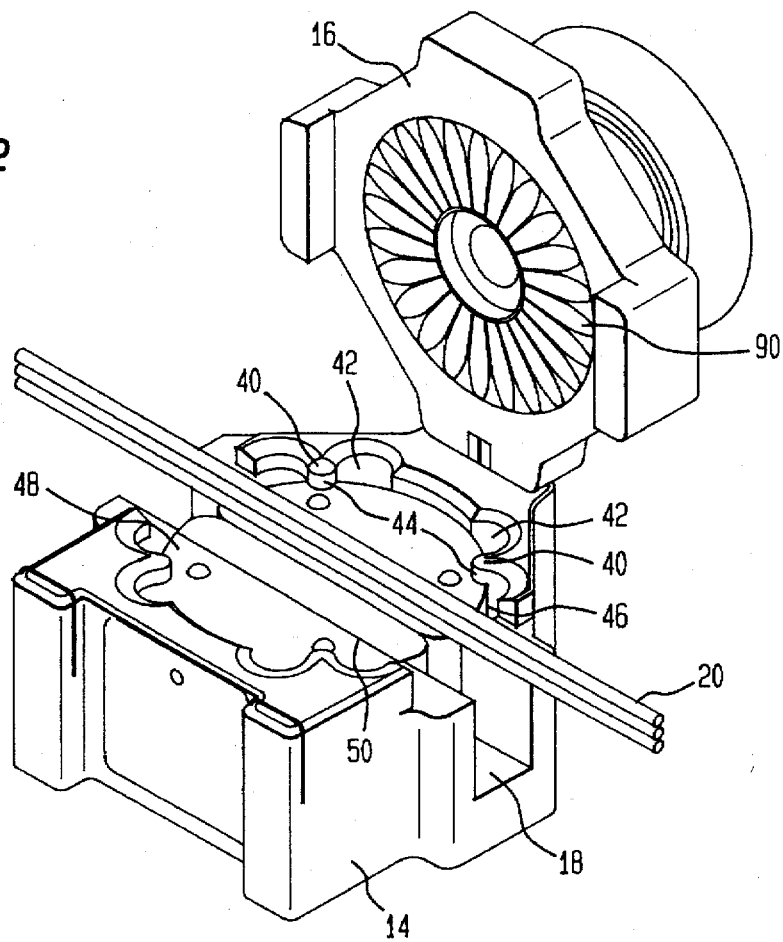
FIG. 2 is a perspective view of the present device with the cap raised and a ribbon in a position to be inserted therein.

The open center of the base is generally circular with a scalloped perimeter. The perimeter has a plurality of substantially equally spaced indentations 40 separated by intervening substantially equally spaced recesses 42, except for the central region 18. The indentations 40 project further inwardly at their uppermost end, providing a lip 44 disposed above a more recessed portion 46, as best seen in FIGS. 2 and 7. The function of these elements is explained below.

Vertical support for the ribbon in the base is provided by a centrally slotted ring 48, with the slot 50 therein designed to receive both the ribbon from the top and the ribbon support bar 24 from the top. The slot is flared at each end to facilitate the insertion of the ribbon therein. The slotted ring is secured to a support ring 52 with screws 54. The resulting ring assembly is supported in the base by a coiled spring 56. The reception of the support bar 24 through slot 50 provides independent suspension for the slotted ring assembly and the support bar 24 which, as noted, is supported by the leaf springs 26. The outer perimeter of the slotted ring has indentations 58 formed therein, which indentations are designed to correspond with and travel on indentations 40. An additional indentation 60 is provided in the perimeter of the slotted ring which provides clearance for a limit screw 62, disposed through the front of the base, to limit rotation of the slotted wheel 90 once it is in place.

While the base and its component parts are generally designed to provide support for the ribbon, the cap and its component parts contain the means for separating a fiber or fibers from the ribbon, in combination with the support provided by the base elements. The cap is secured to the base with a hinge block 70 with an aperture 72 near the upper end thereof. Aperture 72 receives a dowel pin 74 which is inserted through a corresponding aperture 76 at the rear of the cap. This permits the cap to be raised from the closed position of FIG. 1 to the open position of FIG. 2. A spring element 78 is secured to the hinge block and, by way of corresponding apertures, to the base with screws 80. Spring element 78 is designed such that it maintains the cap in the open position shown in FIG. 2 and assists in biasing the cap to the closed position shown in FIG. 1.

The bottom of the cap has an open center portion which receives a slotted, toothed, wheel member 90 that is rotatable therein. The toothed portion 91 is mounted on an elongated axle 92. The axle has diametrically opposed guide slots 94 which are aligned with the shallowest slots in the toothed portion of the wheel member. An indexed dial 96 is disposed on top of the cap and is rotatably mounted thereon. The dial includes tabs 98 which project inwardly from the open center of the dial into the guide slots 94, thereby ensuring that the wheel member and the dial rotate in unison. The upper face of the dial is numbered from one to twelve around one-half of its circumference and also from one to twelve around the other half. These numbers are located in the indicator markings 100 on the face of the dial with each number being diametrically opposed to the corresponding number on the other side of the dial, i.e. 1-1, 2-2, etc. The cap assembly further includes a handle 102 with a threaded insert 104 disposed in the lower face thereof. The handle is mounted on a coil spring 106 which rests on the dial. The entire cap assembly is secured together by a screw 108 which extends upwardly through the toothed wheel member, the dial, and into the threaded insert 104 that is secured in the handle. This arrangement permits the handle, dial, and toothed wheel to rotate in unison. In addition, depressing the handle causes the toothed wheel member to extend downwardly and thus outwardly from the housed or resting position shown in FIG. 2 and the extended operational position shown in FIG. 4.

The slotted wheel member includes a plurality of receiving slots 110. In this embodiment, the slots range in depth from a depth sufficient to receive a single fiber, progressively extending to a depth for receiving twelve fibers. Directly opposite each slot is a slot with a corresponding depth. Thus, the ribbon is received in the slotted wheel in two spaced, but linearly aligned slots. The slots are arranged approximately fifteen degrees (15°) apart. The inner surfaces 112 of the individual teeth 114 are rounded to prevent any undue stress on the ribbon when it is disposed in the slots 110. The teeth are also slightly flared relative to one another, to provide sufficient space for the angular displacement force to be applied to the ribbon.

Figure 3:
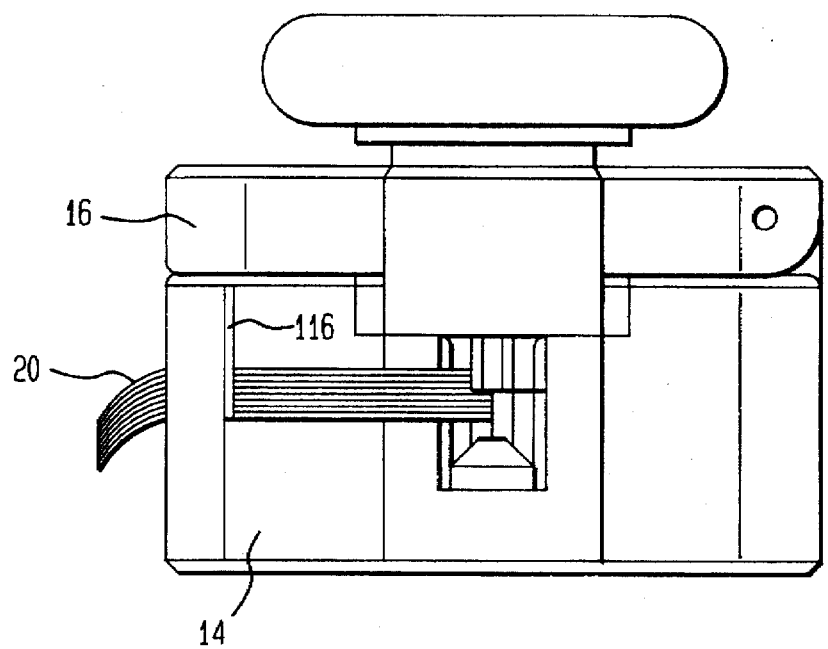
FIG. 3 is a side elevational view of the present device similar to FIG. 1, with the ribbon to be separated inserted therein.

In the use and operation of the present device and method, a ribbon to be separated is inserted into slot 50, as shown in FIG. 2. Where some of the fibers in the ribbon are "live," they are normally disposed at the lower end of the inserted ribbon to minimize any possibility of signal loss in the live fibers from the separation operation. The free ends of the fibers can be disposed in slots 116 provided in the base for this purpose, as shown in FIGS. 1 and 3. The slotted ring in the base can accommodate a 24 fiber width ribbon, other sizes, of course, being possible.

With the ribbon in place in slot 50, the cap is closed, as shown in FIG. 1. An indicator means in the form of arrow 118 is provided in the cap in vertical alignment with the ribbon disposed therein. The handle, dial, and slotted wheel member are then rotated to align the numbers on the dial, which indicate the number of fibers to be separated from the uppermost end of the ribbon, with the arrows 18.

Figure 4:
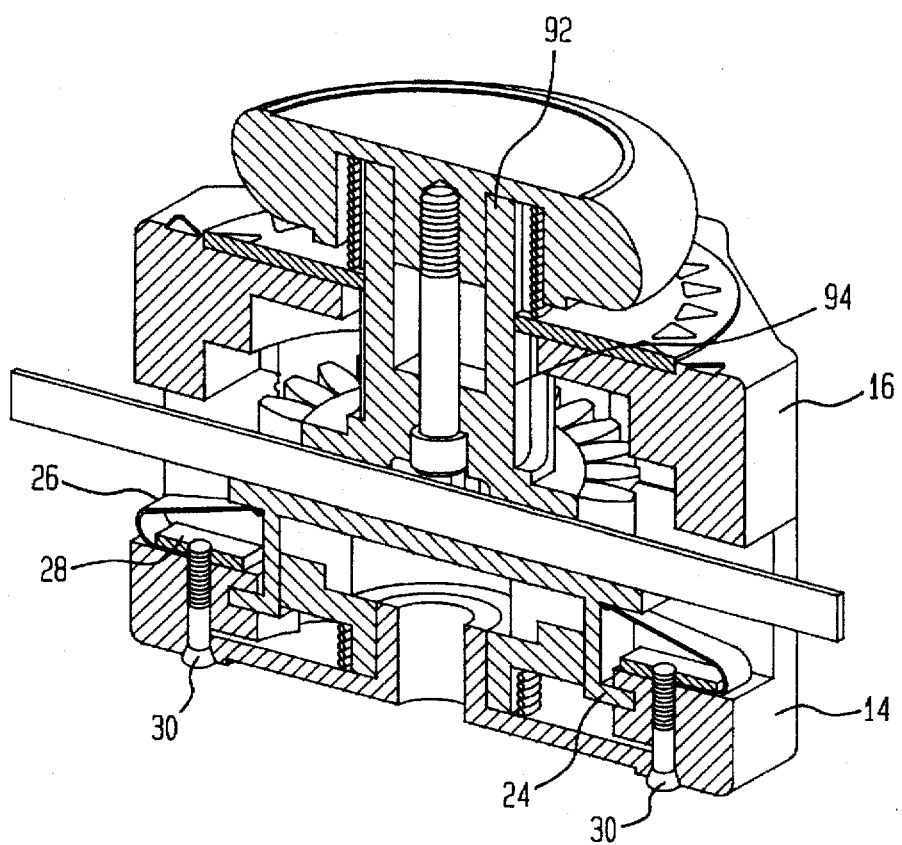
FIG. 4 is a cross-sectional view of the present device with the ribbon inserted therein, the section being taken along lines 4—4 of FIG. 1.

The handle is then depressed, as shown in FIGS. 3 and 4, seating the ribbon firmly against the support bar 24 with its relatively high rate support springs 26. The upper end of the ribbon enters the slots in the toothed wheel while the portion of the ribbon that is to be left intact is contained within slot 50 in the upwardly biased slotted ring 48.

At this point, the teeth 114 are disposed in the recesses 42 in the base. Upon depressing the handle, the toothed portion of the wheel is moved below the lips 44 and into the region defined by the recesses 46. This permits the handle to be turned slightly, approximately seven and one-half degrees (7.5°), one-half of the distance between the teeth 114.

Figure 5:
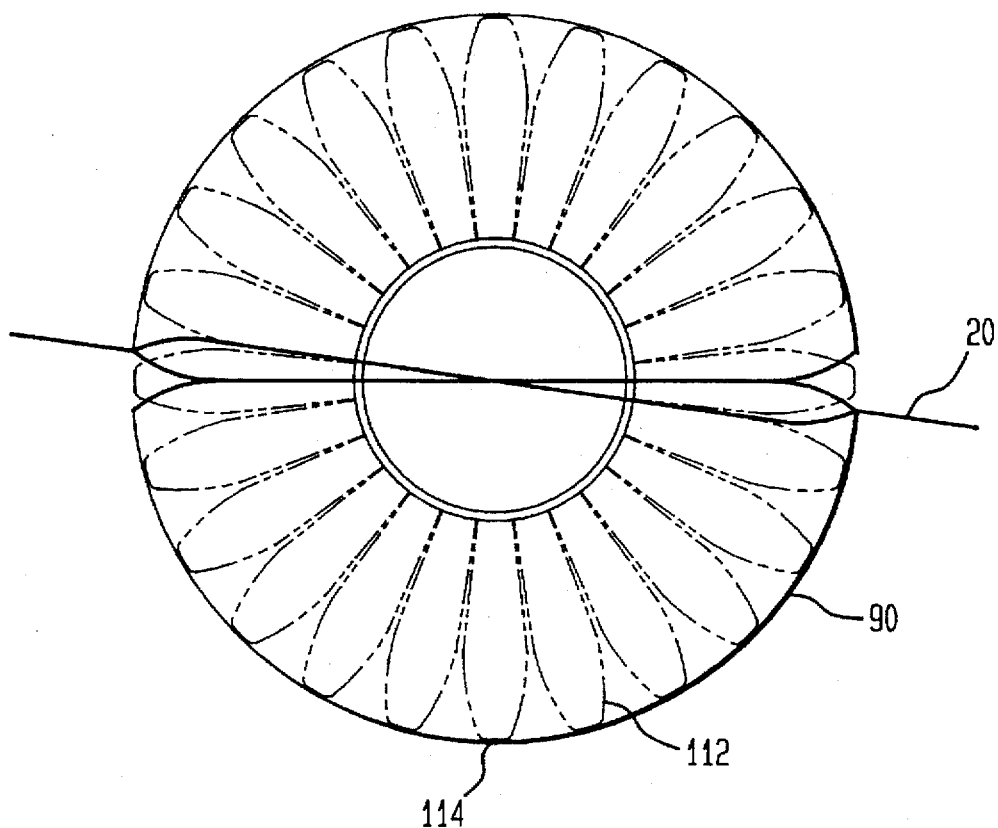
FIG. 5 is a diagrammatical bottom plan view of the operation of the device, illustrating the separation of the ribbon fibers.
Figure 6:
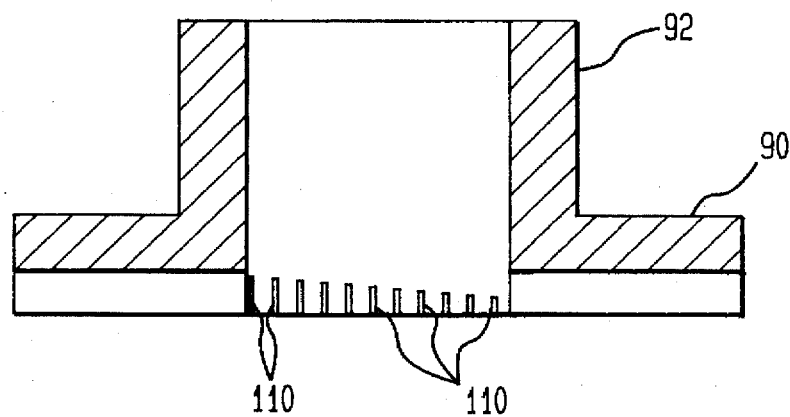
FIG. 6 is a cross-sectional view of the slotted wheel member, illustrating the progressive depth of the slots, the section being taken along line 6—6 of FIG. 5.

As shown in FIG. 5, the angular displacement of the receiving slot in the toothed wheel relative to the support means applies lateral pressure to the ribbon in two places and in opposite directions. This displacement is sufficient to separate the desired member of fibers without damage and with a minimum of bending or applied force.

By depressing the handle and turning it slightly, without a ribbon in place, several of the teeth 114 can be disposed below lips 44. This locks the handle close to the cap, making the device more compact for ease of transport and storage.

Thus, while an apparatus and method for separating one or more optical fiber ribbons from an optical fiber ribbon cable has been shown and described in detail herein, various additional changes and modifications may be made without departing from the scope of the present invention.

I claim:

1. An apparatus for separating fibers in a ribbon array of fibers from other fibers in its array, said apparatus comprising:

a base member having support means therein for receiving and supporting an optical fiber ribbon;

a cap member adapted to overlie said base member having at least one fiber ribbon receiving slot therein, said slot being adapted to receive a portion of the fiber ribbon supported in said base member support means; and means for angularly displacing said slot relative to said support means for separating that portion of a fiber ribbon in said support means from that portion of the fiber ribbon in said slot.

2. The apparatus as claimed in claim 1, wherein said cap member has a plurality of fiber receiving slots therein in the form of a slotted wheel.

3. The apparatus as claimed in claim 2, wherein each of said plurality of slots has a different depth from adjacent slots for receiving a predetermined number of fibers in the ribbon, different from the number of fibers receivable by adjacent slots.

4. The apparatus as claimed in claim 1, wherein said cap member is hingedly connected to said base member.

5. The apparatus as claimed in claim 1, wherein the means for angularly displacing said slot relative to said support means comprises a member containing said slot, said member being rotatably mounted in said cap.

6. An apparatus for separating optical fibers in a ribbon array from other fibers in the array, said apparatus comprising:

a housing member having a base portion and a cap portion;

said base portion having a longitudinal slot therein for receiving and supporting a fiber ribbon;

said cap member having a movable member therein having a separating slot for receiving a portion of a fiber ribbon supported in said longitudinal slot in said base portion;

means for moving said movable member in translation to cause said separating slot therein to engage a fiber ribbon supported in said longitudinal slot; and said means for moving including means for rotatably moving said separating slot relative to said longitudinal slot to separate that portion of a fiber ribbon in said separating slot from that portion of the fiber ribbon in said longitudinal slot.

7. The apparatus as claimed in claim 6, wherein said longitudinal slot has a depth less than the width of the fiber ribbon to be separated.

8. The apparatus as claimed in claim 6, wherein said separating slot has a depth less than the width of the fiber ribbon to be separated.

9. The apparatus as claimed in claim 6, wherein said separating slot has a depth approximately equal to the width of that portion of the fiber ribbon to be separated.

10. The apparatus as claimed in claim 6, wherein said movable member comprises a substantially planar slotted wheel having a plurality of diametric separating slots extending across the planar face of said wheel, each of the slots having a different depth than adjacent slots.

11. The apparatus as claimed in claim 10, where the depth of each slot of the plurality of slots is substantially equal to the width of the fiber ribbon to be separated from the fiber ribbon in said longitudinal slot.

12. The apparatus as claimed in claim 11, and further including means for aligning a separating slot of the desired depth with said longitudinal slot.

13. A method for separating at least one fiber from a ribbon array of at least two fibers comprising the step of:

exerting a lateral force against one of said fibers in said ribbon array to cause separation of said one fiber from said array.

14. The method as claimed in claim 13 and including the additional step of:

supporting said ribbon array along a portion of the length thereof prior to exerting lateral force against said ribbon.

15. The method as claimed in claim 13 and including the additional step of:

exerting a second lateral force against one of said fibers in said array in an area of said fiber spaced from the first-mentioned lateral force.

16. The method as claimed in claim 15 in which said first-mentioned and second lateral forces are exerted in opposite directions.

* * * * *